United States Patent [19]

Bays et al.

[11] Patent Number: 5,754,590
[45] Date of Patent: May 19, 1998

[54] MODEM ARCHITECTURE FOR INTEGRATED CONTROLLER AND DATA PUMP APPLICATIONS

[75] Inventors: Laurence Edward Bays, Allentown; Jalil Fadavi-Ardekani, Orefield, both of Pa.; Walter G. Soto, Irvine, Calif.

[73] Assignee: Lucent Technologies, Inc., Murray Hill, N.J.

[21] Appl. No.: 649,367

[22] Filed: May 17, 1996

[51] Int. Cl.$^6$ ............................................. H04L 5/16
[52] U.S. Cl. ....................... 375/222; 395/401; 395/680
[58] Field of Search ................................. 364/131, 133, 364/134, 514 A; 370/260, 249; 375/222; 395/200.13, 474, 480, 823, 842, 401, 680

[56] References Cited

U.S. PATENT DOCUMENTS

| | | | |
|---|---|---|---|
| 5,034,962 | 7/1991 | Yamamoto et al. | 375/222 |
| 5,432,711 | 7/1995 | Jackson et al. | 364/131 |
| 5,432,804 | 7/1995 | Diamondstein et al. | |
| 5,450,603 | 9/1995 | Davies | 364/133 |
| 5,584,010 | 12/1996 | Kawai et al. | 395/474 |
| 5,602,902 | 2/1997 | Satterlund et al. | 375/222 |
| 5,617,423 | 4/1997 | Li et al. | 375/222 |

*Primary Examiner*—Stephen Chin
*Assistant Examiner*—Joseph Roundtree

[57] ABSTRACT

A new modem architecture that substantially minimizes the cost of adding features to the modem, and substantially minimizes the time overhead associated with the slave-like interface between the modem controller and the modem signal processor. The architecture enables the signal processor to directly access the controller's memory resources so that the signal processor can make most efficient use of its own internal expensive high-speed memory.

13 Claims, 2 Drawing Sheets

MODEM ARCHITECTURE FOR INTEGRATED CONTROLLER AND DATA PUMP APPLICATIONS

FIELD OF THE INVENTION

The present invention relates to data communications equipment, and more particularly to a new modem architecture.

BACKGROUND OF THE INVENTION

Digital terminal equipment (DTE) such as computers and facsimile machines routinely send and receive information and control signals through communications networks (i.e. the telephone network). In order to effectively use the network facilities, however, the DTE must have a means of translating digital data into a form suitable for transmission over the network. Similarly, DTE devices at the receiving end must have a means for translating that signal back into digital form, check for errors, and make use of the information.

The most common type of equipment used for such data transmission is a modem. A modem is data communication equipment (DCE) that is capable of modulating and demodulating digital data over a communication medium of a communications network. For example, in communicating over a telephone network, one modem translates the digital data generated by the originating DTE into digital pulses and sends the pulses over the telephone network to a second modem at the receiving end. The receiving modem then translates the digital pulses back into the digital data and sends the data to the receiving DTE.

A typical present day modem architecture is shown in FIG. 1. Such present day modems have a controller and a signal processor which are electrically connected to each other through an interface circuit. The controller provides supervisory functions in the modem, such as inserting control commands in the data stream for error and flow control which is normally referred to as "link layer", and providing data compression. The signal processor, codec and the interface circuit act together form a data pump which is responsible for carrying out the digital communication portion of the modem including startup, retrains, modulation, demodulation, channel equalization, echo cancellation and timing recovery. As a result, the data pump is responsible for implementing various CCITT standards of the modem, such as the V.34 standard which establishes 28.8Kb/sec two-way communication. Basically, the controller supervises the data stream and the signal processor prepares the stream for communication over a predetermined medium (i.e. a telephone line).

As shown in FIG. 1, the controller and the signal processor of a typical modem have separate memory resources, and thus separate memory and I/O registers and buses. The memory dedicated to the controller is composed of memory for instructions (e.g. ROM), and memory for data including scratchpad or RAM, wherein the RAM can be used to provide a controller stack, a dictionary for compression engine, and a space where data is prepared for transmitting and/or evaluated when received.

The memory dedicated to the signal processor is composed of memory for instructions (i.e. ROM) and scratchpad memory for signal processing functions such as storing the intermediate values of the received modem waveform. In addition, for modulation needs, the signal processor needs to store slow "symbol" data which is saved in the signal processor RAM as bulk delay information, wherein the bulk delay is used for long distance calls encountering satellite hops (less than two). In today's modems, the bulk delay usually takes up to 50% of the signal processor RAM. Thus, adding significantly to the modem cost. Moreover, in operation, the signal processor performs many calculations to prepare the data for transmission. As a result, the memory dedicated to the signal processor is typically high speed, costly memory.

For some applications, the amount of signal processor memory required to perform the data pump functions can also become significantly large. In general, the amount of signal processor and controller memory depends on the amount of features a modem provides to the DTE. That is, the required amount of signal processor memory increases as the number of modem features increases. As a result, present day modems can become quite costly, and thus less desirable for some of the more demanding applications.

For example, there is an increasing need and desire for digital simultaneous voice and data (DSVD) communications through a single DCE or modem. In such DSVD communications, the modem will be required to provide the simultaneous transmission of both voice and data on the same line. In addition to requiring the controller to handle the separation and combination of two simultaneous bit streams, such DSVD communications will require the signal processor to look at more data points in the bit stream per unit time. As a result, the signal processor will perform an increased number of mathematical operations to disguise the speech or voice on the modem waveform when transmitting the data. This increased demand on operation of the controller and signal processor necessitates a greater demand on the mega-instructions-per-second (MIPS) performed by the signal processor, and thus necessitates an exponential growth in the costly high speed internal memory of the signal processor. As a result, in providing such features as DSVD, the present day modem may become quite expensive.

Another problem with present day modems is the slave-like interface between the signal processor and the controller. In present day modems, the controller perceives this interface as a fixed set of read and write registers which communicate with the signal processor to initiate, handshake, maintain, and terminate the actual modem link. In determining whether to initiate or terminate a controller I/O event, such as DMA transfers or Timer resets, the controller waits for a signal from the signal processor through this slave-like interface. Typically, to initiate an I/O peripheral control condition, either the controller polls the fixed registers of the data pump or the data pump interrupts operation of the controller. Both of these operations add timing overhead to the operation of the controller and the signal processor. These response-time overheads reduce the MIPS of the signal processor and controller, and thus reduce the ability of the modem to provide more demanding features such as DSVD.

SUMMARY OF THE INVENTION

Accordingly, the present invention provides a DCE or modem architecture having a signal processor that gains direct control over the controller's memory and I/O space without having to communicate through a slave-like interface. In addition, the architecture provides a bus bridge that electrically connects the signal processor bus to the controller's memory bus. This enables the signal processor to gain direct access to the controller's memory and use the controller's cheaper memory for less demanding signal processor functions, and thus free-up its own internal memory for other more demanding functions.

In one embodiment of the present invention, a DCE or modem has a single chip that houses both the signal processor and the controller. The controller is electrically connected to a controller memory through a controller bus. The signal processor is electrically connected to the controller memory through a bus bridge, which provides the signal processor with direct access to the controller memory. As a result, the controller and signal processor can negotiate the ownership of the controller bus connected to the common memory resource. This enables the controller and the signal processor to utilize the common memory resource without significantly interrupting the processing function of the other, and thus maintain high MIPS. The combining of the controller and signal processor on one chip may also provide for eliminating the slave-like I/O interface between them, in one illustrative embodiment.

These and other features of the invention are described in more complete detail in the following detailed description of the invention when taken with the drawings. The scope of the invention, however, is limited only by the claims appended hereto.

DETAILED DESCRIPTION OF THE INVENTION

Figure 1:
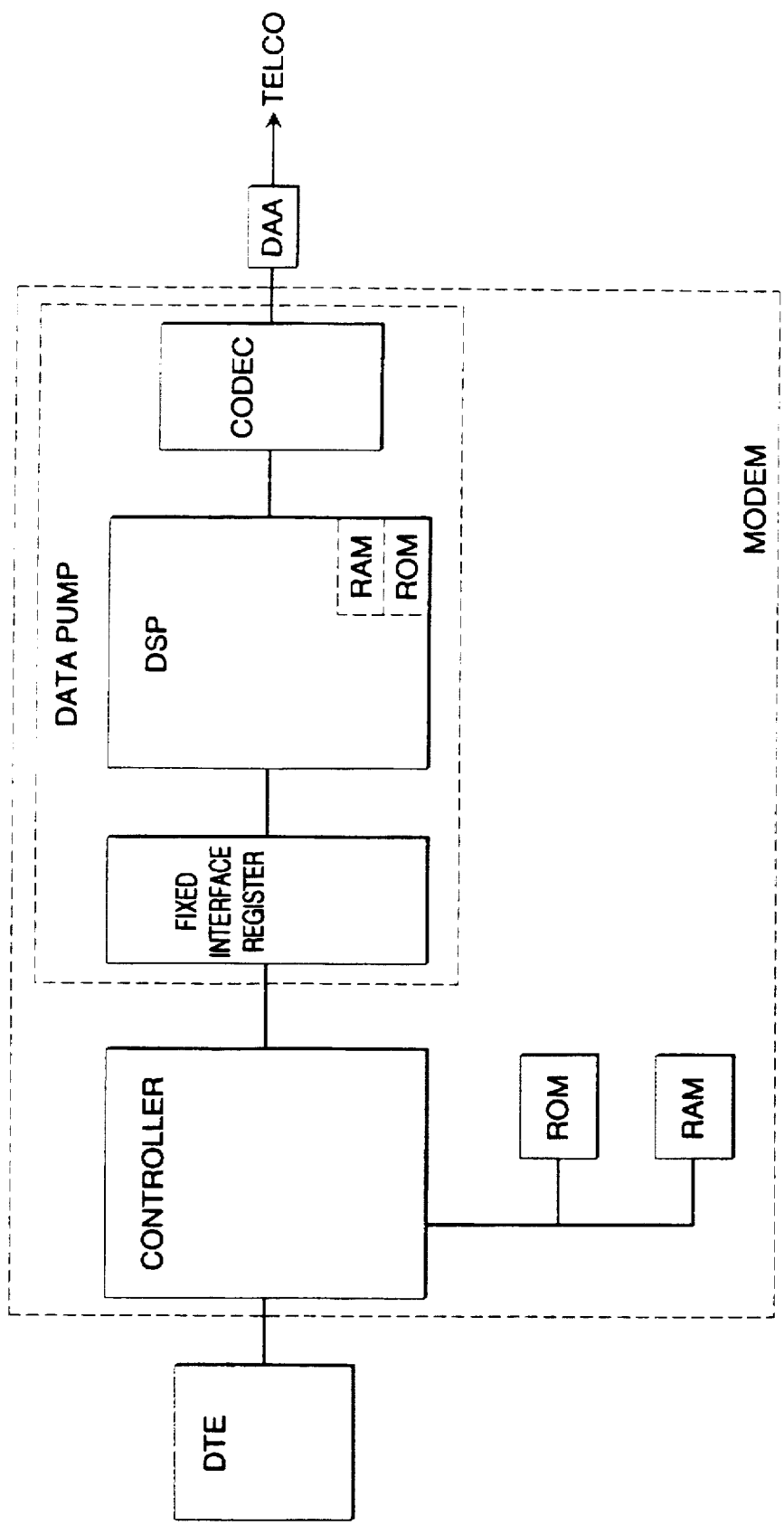
FIG. 1 is a block diagram of a typical architecture for a modem of the prior art.
Figure 2:
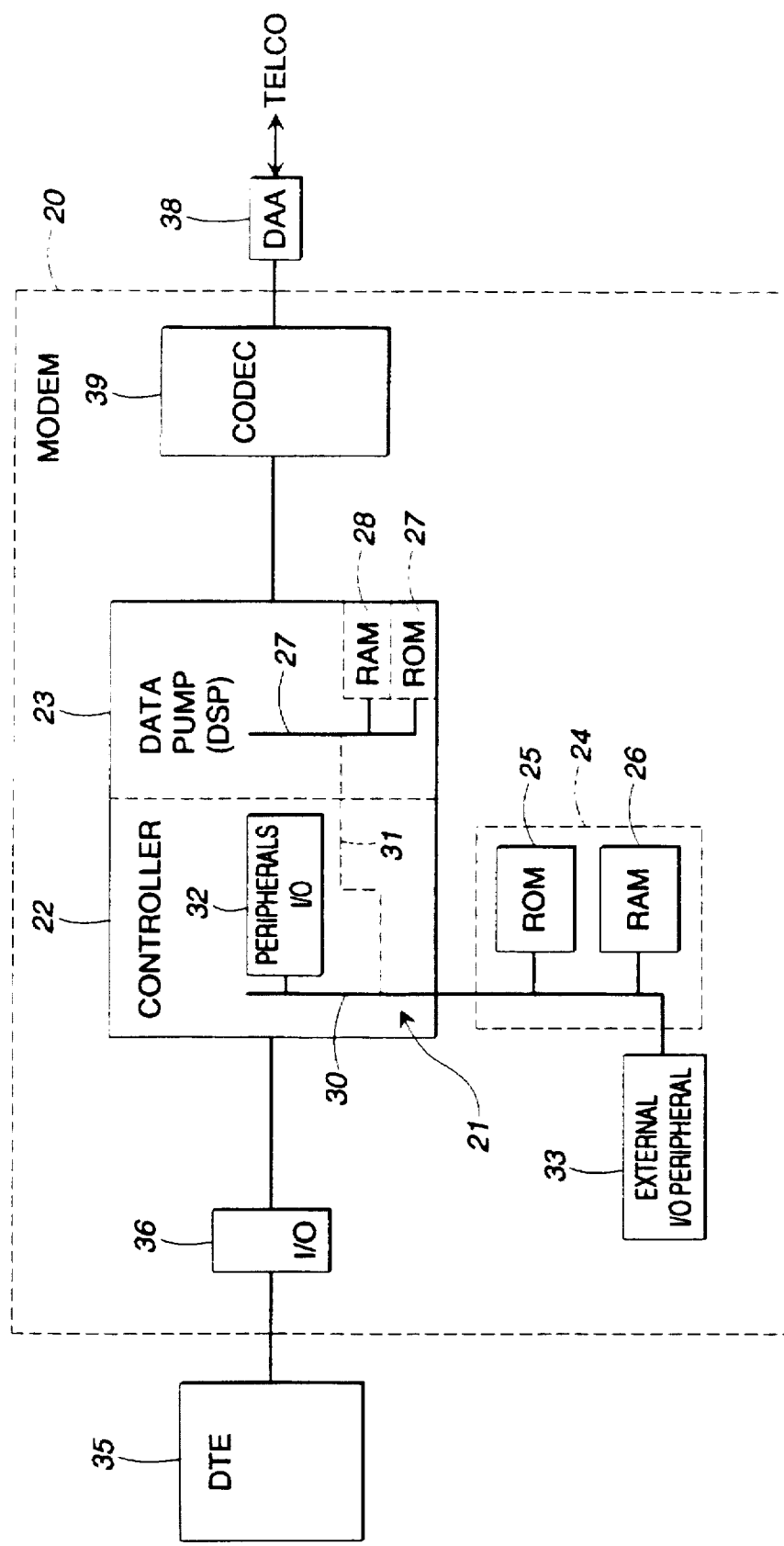
FIG. 2 is an exemplary embodiment of the new modem architecture of the present invention.

Referring now to FIG. 2, there is shown one embodiment of the new architecture of the present invention, hereafter referred to as modem 20. As shown, modem 20 has a single chip 21 housing both a controller 22 and a signal processor 23. Controller 22 is electrically connected to a controller memory resource 24 including read-only memory (ROM) 25 and random access memory (RAM) 26 through controller memory bus 30. Also, the controller 22 is electrically connected to the controller I/O resource space 32. The signal processor 23 has direct control over the controller memory resource 24 and controller I/O resources 32.

Signal processor 23 has a dedicated signal processor bus 29 electrically connected to internal high speed memory including ROM 27 and RAM 28. Bus Bridge 31 electrically connects signal processor bus 29 to controller memory bus 30, and thus connects signal processor 23 to controller memory and I/O peripheral resource 24. The single chip 21 is electrically connected to DTE 35 through interface 36, and electrically connected to transmission line 38 (i.e. of a local telephone company) through a coder/decoder (codec) device 39 which converts incoming information from analog to digital (A/D) and outgoing information from signal processor 23 from digital to analog (D/A).

In operation, digital data is sent to controller 22 (in single chip 21) through interface 36. Controller 22 then performs supervisory and link-layer functions such as inserting control commands in the data stream and compressing the data. The compressed data is then passed to signal processor 23 via a pointer exchange to reduce the actual data transfer overhead (i.e. timing overhead), which carries-out the digital communication portion of modem 20 including modulation, demodulation, channel equalization, echo cancellation and timing recovery. It is the improved functionality of signal processor 23 and controller 22 that is enabled through the new modem architecture described herein. As a result, the improved performance is described in greater detail below.

In the new modem architecture, as shown in FIG. 2, the interface between the controller and the signal processor has been eliminated. This, in turn eliminated the need for the slave-like I/O interface between the controller and the signal processor as associated with the prior art. As a result, the new architecture enables signal processor 23 to gain direct control over the I/O space (not shown) of controller 22. This gives signal processor 23 the ability to initiate or terminate an I/O peripheral event like DMA transfers or timer resets. That is, the new architecture substantially minimizes the timing overhead associated with the prior art, thus insuring maximum MIPS therein.

In addition, the new architecture provides a controller memory resource 24 which can be accessed by signal processor 23 through bus bridge 31. This enables signal processor 23 to use the slower, cheaper controller memory 24 for its less demanding functions, such as dynamic mailbox control and bulk delays. As a result, the architecture enables signal processor 23 to make more efficient use of its own high speed, expensive, internal memory including RAM 27 and ROM 28. This, in turn, enables signal processor 23 to provide more features to modem 20 without having to substantially increase the amount of the expensive internal memory of the signal processor. Thus, keeping modem costs down as the demand for more complex features increases.

For example, there is an increasing need and desire for digital simultaneous voice and data (DSVD) communications through a single DCE or modem. In such DSVD communications, the modem will be required to provide the simultaneous transmission of both voice and data on the same line. In addition to requiring the controller to handle the separation and combination of two simultaneous bit streams, such DSVD communications will require the signal processor to look at more data points in the bit stream. As a result, the signal processor will perform an increased number of mathematical operations to disguise the speech or voice on the modem waveform when transmitting the data. This increased the demand on the processing power of the controller and signal processor necessitates a greater demand on the MIPS, and necessitates a significant growth of the expensive high speed internal memory of the signal processor. A modem having a new architecture, as described in the present invention, substantially reduces this problem.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A modem comprising:
    a controller having a controller memory resource;
    a controller bus coupled between said controller and said controller memory resource;
    a digital signal processor, said digital signal processor having a predetermined amount of internal high speed memory and a dedicated signal processor bus; and
    a bus bridge coupled between said signal processor bus and said controller bus to provide said digital signal processor with direct control over the controller memory and I/O resources.

2. The modem of claim 1 wherein said controller memory resource comprises a predetermined amount of read-only-memory and a predetermined amount of random access memory.

3. The modem of claim 2 wherein said signal processor has internal high speed memory.

4. The modem of claim 3 wherein said controller memory resource is slower than said internal high speed memory of said signal processor.

5. The modem of claim 4 wherein said internal high speed memory of said signal processor comprises a predetermined amount of random-access-memory and a predetermined amount of read-only-memory.

6. The modem of claim 1 wherein said digital signal processor and said controller are housed in a common chip.

7. A modem comprising:
   a controller having a controller memory resource;
   a controller bus for providing electrical communication between said controller and said controller memory resource;
   a digital signal processor, said digital signal processor having a predetermined amount of internal high speed memory and a dedicated signal processor bus; and
   a bus bridge for electrically coupling said signal processor bus to said controller bus to provide said digital signal processor direct access to said controller memory resource.

8. The modem of claim 7 wherein said controller memory resource comprises a predetermined amount of read-only-memory and a predetermined amount of random access memory.

9. The modem of claim 8 wherein said signal processor has an internal high speed memory.

10. The modem of claim 9 wherein said controller memory resource is slower than said internal high speed memory of said digital signal processor.

11. The modem of claim 7 wherein said internal high speed memory of said digital signal processor includes a predetermined amount of random-access-memory and a predetermined amount of read-only-memory.

12. The modem of claim 7 wherein said digital signal processor and said controller are housed in a common chip.

13. The modem of claim 7 wherein said bus bridge further provides said digital signal processor direct access to said controller I/O resources.

* * * * *